United States Patent
Driscoll

(10) Patent No.: US 8,051,296 B2
(45) Date of Patent: Nov. 1, 2011

(54) SYSTEM AND METHOD FOR INITIALIZING SECURE COMMUNICATIONS WITH LIGHTWEIGHT DEVICES

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1505 days.

(21) Appl. No.: 11/027,089

(22) Filed: Dec. 30, 2004

(65) Prior Publication Data

US 2006/0156019 A1 Jul. 13, 2006

(51) Int. Cl.
*H04L 9/00* (2006.01)

(52) U.S. Cl. ........ 713/182; 713/169; 713/172; 380/227; 380/277; 380/282; 380/283; 380/284; 726/2; 726/4; 726/9

(58) Field of Classification Search .......... 713/1, 2, 713/188, 194, 182, 190, 169, 172; 380/200, 380/201, 255, 277–278, 282–284, 227; 726/2, 726/4, 9
See application file for complete search history.

(56) References Cited

U.S. PATENT DOCUMENTS

| | | | |
|---|---|---|---|
| 6,678,827 B1 * | 1/2004 | Rothermel et al. | 726/6 |
| 6,807,277 B1 * | 10/2004 | Doonan et al. | 380/281 |
| 6,898,288 B2 * | 5/2005 | Chui | 380/278 |
| 7,178,034 B2 * | 2/2007 | Cihula et al. | 713/186 |
| 7,182,277 B2 * | 2/2007 | Vedrine et al. | 239/329 |
| 7,334,125 B1 * | 2/2008 | Pellacuru | 713/163 |
| 7,412,059 B1 * | 8/2008 | Pauker et al. | 380/277 |
| 7,526,656 B2 * | 4/2009 | Inomata et al. | 713/189 |
| 2001/0052071 A1 * | 12/2001 | Kudo et al. | 713/156 |
| 2002/0083346 A1 * | 6/2002 | Rowlands | 713/201 |
| 2003/0204738 A1 * | 10/2003 | Morgan | 713/194 |
| 2004/0025014 A1 * | 2/2004 | Kaler et al. | 713/163 |
| 2004/0030891 A1 * | 2/2004 | Kurihara | 713/168 |

(Continued)

FOREIGN PATENT DOCUMENTS

WO WO-0172012 A2 9/2001

(Continued)

OTHER PUBLICATIONS

Carman, D. W., et al., "Constraints and Approaches for Distributed Sensor Network Security", *Cryptographic Technologies Group Trusted Information Systems, NAI Labs, Network Associates Inc.*, (Sep. 1, 2000),1-126.

(Continued)

*Primary Examiner* — Philip Chea
*Assistant Examiner* — Joseph Pan
(74) *Attorney, Agent, or Firm* — Schwegman, Lundberg & Woessner, P.A.

(57) ABSTRACT

System and methods for initializing secure communications with lightweight devices are described herein. In one embodiment, the method includes enabling a device manager to securely communicate with a lightweight device, the method comprising receiving encrypted data from the device manager, wherein the device manager received the encrypted data from the lightweight device. In the embodiment, the method also includes decrypting the encrypted data to produce access information, wherein the access information enables the device manager to securely communicate with the lightweight device. In the embodiment, the method also includes securely transmitting the access information to the device manager.

35 Claims, 8 Drawing Sheets

U.S. PATENT DOCUMENTS

| | | | | |
|---|---|---|---|---|
| 2004/0223054 | A1* | 11/2004 | Rotholtz | 348/143 |
| 2005/0005093 | A1* | 1/2005 | Bartels et al. | 713/150 |
| 2006/0136726 | A1* | 6/2006 | Ragnet et al. | 713/171 |

FOREIGN PATENT DOCUMENTS

| | | |
|---|---|---|
| WO | WO-0197452 A1 | 12/2001 |
| WO | WO-2005010214 A2 | 2/2005 |

OTHER PUBLICATIONS

Jamshaid, K., et al., "SEKEN: Secure and Efficient Key Exchange for Sensor Networks", *Performance, Computing, and Communications, 2004, IEEE International Conference on Phoenix, AZ, Apr. 15-17, 2004, Piscataway, NJ, USA, IEEE*, 415-422.

\* cited by examiner

SYSTEM AND METHOD FOR INITIALIZING SECURE COMMUNICATIONS WITH LIGHTWEIGHT DEVICES

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention relates generally to the field of data communications and more particularly to initializing secure communications with lightweight devices.

BACKGROUND

Computer networks often include a device manager that manages or controls a number of lightweight devices. Lightweight devices are relatively simple electronic devices that accomplish tasks using minimal logic (e.g., relatively simple circuits, ASICS, or processors). Because lightweight devices do not have sophisticated logic or large memory, it may be difficult for them to perform complex operations necessary for establishing secure communications channels with other network devices. Device managers can be general-purpose computers or other more sophisticated electronic devices.

Typically, when a computer network is initially deployed into the field, a field technician uses a secure communication channel to configure the lightweight devices and/or the device manager to enable secure communications between the manager and the lightweight devices. For example, one prior art technique calls for establishing a temporary secure physical link between the lightweight devices and configuration equipment. In particular, when configuring the network, a field technician uses configuration equipment to physically transfer cryptographic keys and other security information into each lightweight device and the device manager. One disadvantage of this technique is that when a device manager fails, the field technician has to physically access and upload new security information to all the lightweight devices and a replacement device manager. Another disadvantage is that adding lightweight devices to the network similarly requires a field technician to establish a temporary secure physical link between the configuration equipment and the new lightweight device and the/or the device manager. Another disadvantage is the need for a specific configuration device that is not a common tool for field technicians. This configuration device is not easily replaced if it is lost or fails. Another disadvantage is that this technique requires additional expertise for the field technicians.

Another prior art technique requires that the lightweight device be connected directly to a device manager over a physically secure link. The disadvantages of this technique are that it is generally impractical to maintain either a large physically secure network or to bring each lightweight device to the device manager's location (or to each device manager's location for networks that have more than one device manager) for the initial installation and for any time that a device manager fails.

SUMMARY

System and methods for initializing secure communications with lightweight devices are described herein. In one embodiment, the method includes enabling a device manager to securely communicate with a lightweight device, the method comprising receiving encrypted data from the device manager, wherein the device manager received the encrypted data from the lightweight device. In the embodiment, the method also includes decrypting the encrypted data to produce access information, wherein the access information enables the device manager to securely communicate with the lightweight device. In the embodiment, the method also includes securely transmitting the access information to the device manager.

In one embodiment, the system includes a lightweight device, wherein the lightweight device includes an access information storage unit to store encrypted data and to store access information. In the embodiment, the system also includes an access authority device to decrypt the encrypted data to produce the access information. In the embodiment, the system also includes a device manager to manage the lightweight device, the device manager to receive the encrypted data from the lightweight device, the device manager to transmit the encrypted data to the access authority device, the device manager to receive the access information from the access authority device, and the device manager to communicate with the lightweight device using the access information.

BRIEF DESCRIPTION OF THE FIGURES

The present invention is illustrated by way of example and not limitation in the Figures of the accompanying drawings in which.

DESCRIPTION OF THE EMBODIMENTS

Systems and methods for initializing secure communications with lightweight devices are described herein. In the following description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" means that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams will be described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams depict serial operations, certain embodiments could perform certain of those operations in parallel or in different sequential order to the same effect.

This description of the embodiments is divided into three sections. In the first section, a system level overview is presented. In the second section, a system architecture is presented, while in the third section, operations of the system are described.

System Overview

This section presents a system level overview, according to exemplary embodiments of the invention.

Figure 1:
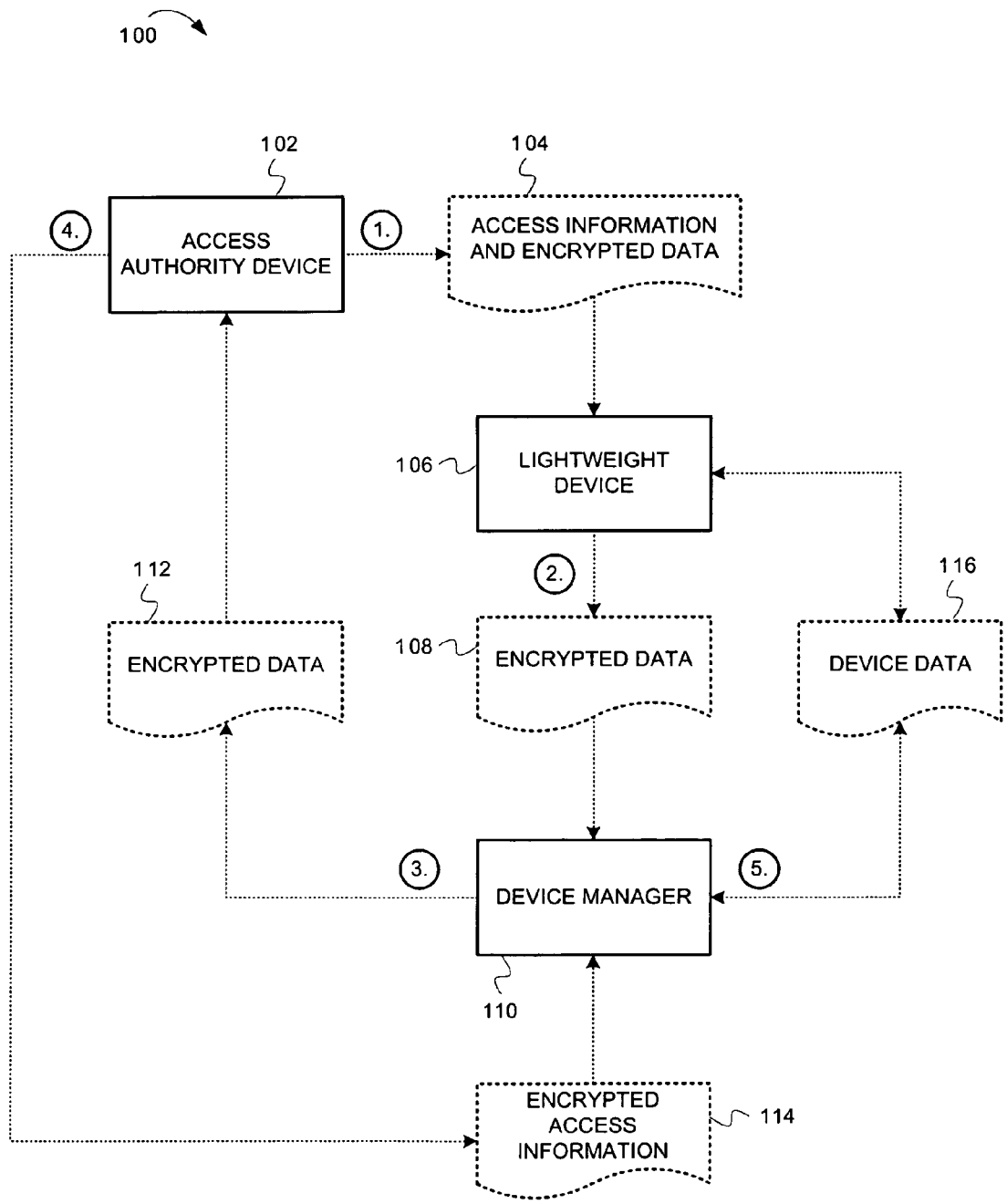
FIG. 1 is a data flow diagram illustrating network communications between a device manager, an access authority, and a lightweight device, according to embodiments of the invention.

FIG. 1 is a data flow diagram illustrating network communications between a device manager, an access authority, and a lightweight device, according to embodiments of the invention.

As shown in FIG. 1, the system 100 includes a lightweight device 106, device manager 110, and an access authority device 102. The lightweight device 106 can be a motion sensor, electromechanical actuator, or other lightweight electronic device, while the device manager 110 can be a general-purpose computer for controlling or managing the lightweight device 106 and for processing data sent to or received from the lightweight device 106. The access authority device 102 can be a general-purpose computer configured to facilitate secure communications between the lightweight device 106 and the device manager 110.

A communication network generally has more than one lightweight device 106 and may have more than one device manager 110. Multiple devices may be used to provide different services or qualities of service; and may be replicated to provide fault tolerance. FIG. 1 is representative of communication between any of the lightweight devices 106 and any device manager 110. Furthermore, the access authority device 102 may be replicated for fault tolerance or load-balancing in such a manner as to be transparent to communication with any device manager 110.

In FIG. 1, there are five stages of data flow between the system components. Stage 1 is typically performed only once. For example, stage 1 can occur during the process of manufacturing the lightweight device 106, when the lightweight device 106 is physically accessible. Stage 1 may also be done at the point of importation into a country; allowing lightweight devices to be manufactured without cryptographic restrictions. Stages 2-4 can be performed whenever a device manager needs to establish secure communication with a lightweight device over an insecure channel. Stages 2-4 can be performed without a field technician physically accessing the lightweight device 106 and without having a preexisting secure channel between the lightweight device 106 and device manager 110. The device manager 110 and the access authority device 102 are capable of establishing secure communications between themselves without performing the data flow operations described in FIG. 1.

During stage 1, the access authority device 102 transmits access information and encrypted data 104 to the lightweight device 106 over a secure channel. The access information can include a set of cryptographic keys or secret information to allow the lightweight device to generate a sequence of cryptographic keys to be used for establishing secure communications between a device manager 110 and the lightweight device 106. The access information may also include a binding between a cryptographic key and access rights to the lightweight device's assets. The encrypted data can include an encrypted version of the cryptographic keys. Stage 1 can occur before the lightweight device 104 is deployed into the field (e.g., at the manufacturing or importation facility) when there is a secure channel between the access authority device 102 and the lightweight device 106.

At stage 2, the lightweight device has been deployed into the field and the device manager 110 is attempting to establish initial secure communications with the lightweight device 106. During stage 2, the lightweight device 106 transmits encrypted data 108 (e.g., the encrypted version of the cryptographic keys) to the device manager 110. At this stage in the data flow, the device manager 110 cannot decrypt the encrypted data 108 because it does not have the necessary decryption keys. During stage 3, the device manager 110 transmits the encrypted data 112 to the access authority device 102 (which has the necessary decryption keys) for decryption. This stage 3 communication may be sent "in the clear" or encrypted in a system that is intelligible to both the device manager 110 and the access authority device 102. During stage 4, the access authority device 102 transmits encrypted access information 114 to the device manager 110 encrypted in a system that is intelligible to both the device manager 110 and the access authority device 102. The encrypted access information 114 can be a version of the cryptographic keys that the device manager 110 is capable of using to communicate with a lightweight device. For example, the cryptographic keys themselves can be encrypted according to a scheme that the device manager 110 can decrypt. The device manager 110 uses the access information to establish secure data transmissions with the lightweight device 106, which received the accesses information during stage 1. During stage 5, the device manager 110 and lightweight device 106 securely exchange device data 116, which can include sensor information and control commands.

As a result of conducting the data flow operations described in the data flow diagram 100, the lightweight device 106 can securely communicate with the device manager 110 over an insecure physical link. The secure communications can be established without physically accessing the lightweight device 106 after it was placed into service in the field and the lightweight device 106 does not need to perform any cryptographic operations during this establishment (stages 1 through 4). In some embodiments, the lightweight device 106 does not need to receive any data once it has been fielded (which allows for transmit-only devices such as sensors).

Hardware and Operating Environment

Figure 2:
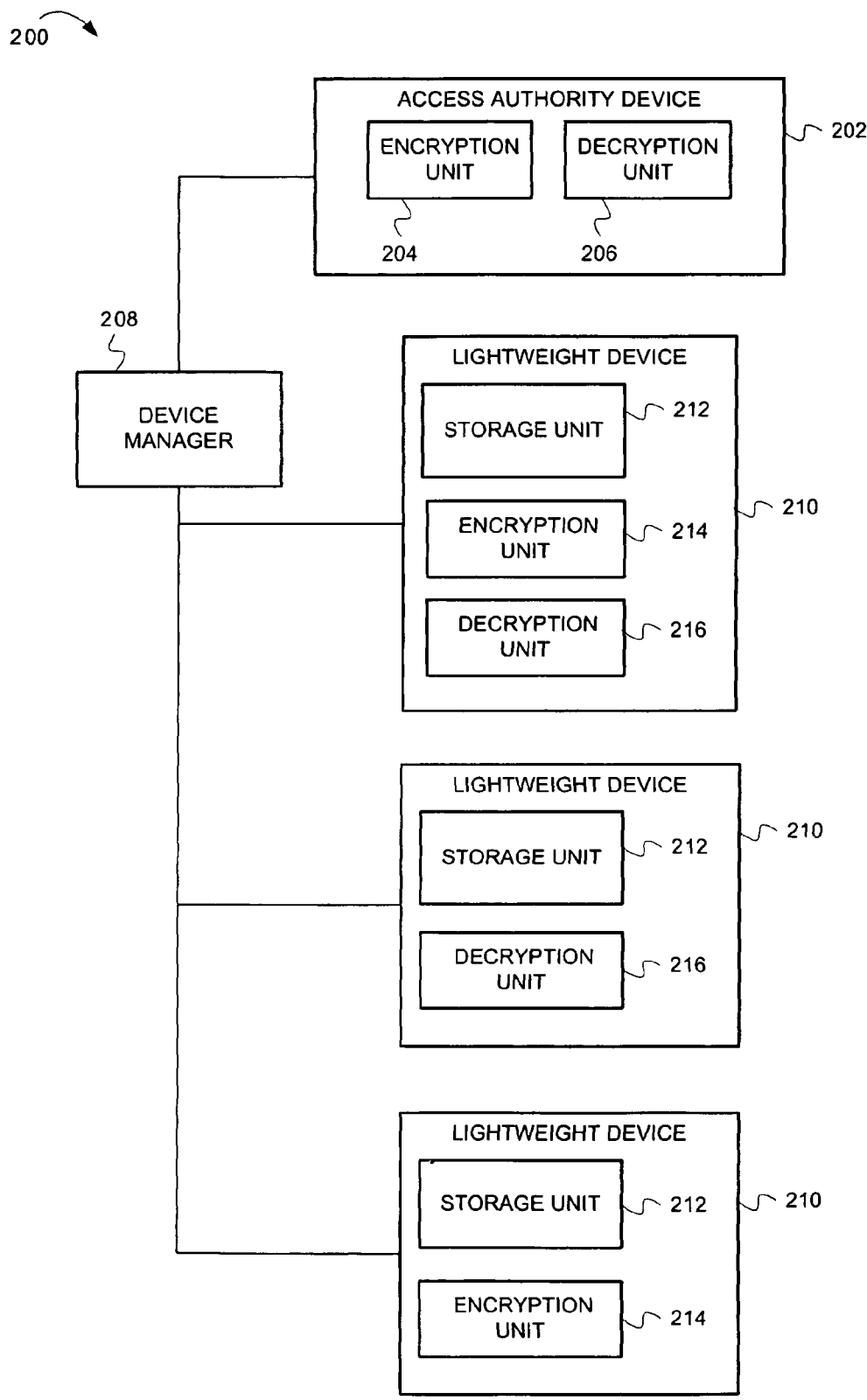
FIG. 2 is a block diagram illustrating an exemplary communications network, according to embodiments of the invention.

This section provides an overview of the exemplary hardware and the operating environment in which embodiments of the invention can be practiced. FIG. 2 will describe a communications network and FIG. 3 will describe an exemplary architecture for one or more of the network devices.

FIG. 2 is a block diagram illustrating an exemplary communications network, according to embodiments of the invention. As shown in FIG. 2, a communications network 200 includes an access authority device 202, which is connected to a device manager 208. In FIG. 2, the device manager 208 is connected to lightweight devices 210.

The access authority 202 can be a general-purpose computer or other electronic device adapted to perform the operations described herein (see the next section). In one embodiment, the access authority 202 is configured as described below in FIG. 3. The access authority 202 includes an encryption unit 204 and a decryption unit 206. The encryption and decryption units can encrypt and decrypt data according to any suitable symmetric or asymmetric encryption algorithm. For example, the encryption and decryption units can encrypt and decrypt data according to public/private key encryption scheme, such as that used to establish secure communications between a Web browser and a Web server. Additionally, the encryption and decryption units can encrypt and decrypt data according to a private key scheme, such as the Advanced Encryption Standard (AES) or an algorithm specifically designed for real-time systems such as BeepBeep. The encryption and decryption units can also encrypt and decrypt data according to privately developed symmetric and asymmetric encryption schemes.

The device manager 208 can be a general-purpose computer or other electronic device adapted for performing the operations described herein (see the next section). In one embodiment, the device manager is configured as the system described in FIG. 3. The device manager 208 controls and/or manages the lightweight devices 210. For example, the device manager 208 can switch the lightweight devices on and off, adjust lightweight device settings, etc. The device manager 208 can also process information collected by the lightweight devices 210. For example, the device manager 208 can determine environmental conditions based on sensory input received from the lightweight devices 210.

The lightweight devices 210 can be any suitable lightweight electronic devices. The lightweight devices can be sensors, such as temperature, vibration, or pressure sensors. The lightweight devices can also include actuators such as solenoids or stepper motors. The lightweight devices 210 can each include combinations of storage units 212, encryption units 214, and decryption units 216. The storage units 212 can be used to store access information and encrypted data. Access information can include cryptographic keys (or key generation information) and bindings between cryptographic keys and access rights, while encrypted data can include an encrypted version of the cryptographic keys. The lightweight devices 210 can use the encrypted data to establish a secure communications channel with the device manager 208, as described in greater detail below (also see the description of FIG. 1 above.).

Although the system 200 includes three lightweight devices 210 and a single device manager 208, alternative embodiments can include any number of lightweight devices and/or device managers. For example, in one embodiment, the system can be configured according to an oligarchy model in which several device managers control the lightweight devices. The device oligarchy can be configured so that several device managers must agree before performing certain operations. For example, three of five device managers must approve operations that delete data from a lightweight device.

Any of the system devices used in conjunction with embodiments of the invention can include machine-readable media including instructions for performing operations described herein. Machine-readable media includes any mechanism that provides (i.e., stores and/or transmits) information in a form readable by a machine (e.g., a computer). For example, a machine-readable medium can be read only memory (ROM), random access memory (RAM), magnetic disk storage media, optical storage media, flash memory devices, electrical, optical, acoustical or other forms of propagated signals (e.g., carrier waves, infrared signals, digital signals, etc.). According to embodiments of the invention, the network devices can be other types of logic (e.g., digital logic) for executing the operations described herein.

The devices of the system 200 can be connected using any suitable networking or interconnection technology. For example, the devices of the system 200 can be connected via an asynchronous transfer mode (ATM) network, Ethernet network, Digital Subscriber Line network (DSL), and/or the Public Switched Telephone network. As another example, the devices of the system 200 can be connected via RS-232 cabling, USB cabling, or other similar connection means. Additionally, the devices can be wirelessly connected using any suitable radio frequency wireless technology, such as Wi-Fi. The network devices can also be connected with wireless optical technologies.

The operations performed by the devices of the system 200 will be described in the next section in the discussion of FIGS. 4-8. As noted above, the device manager 208 and the access authority device 202 can be general-purpose computers configured as described in FIG. 3.

Figure 3:
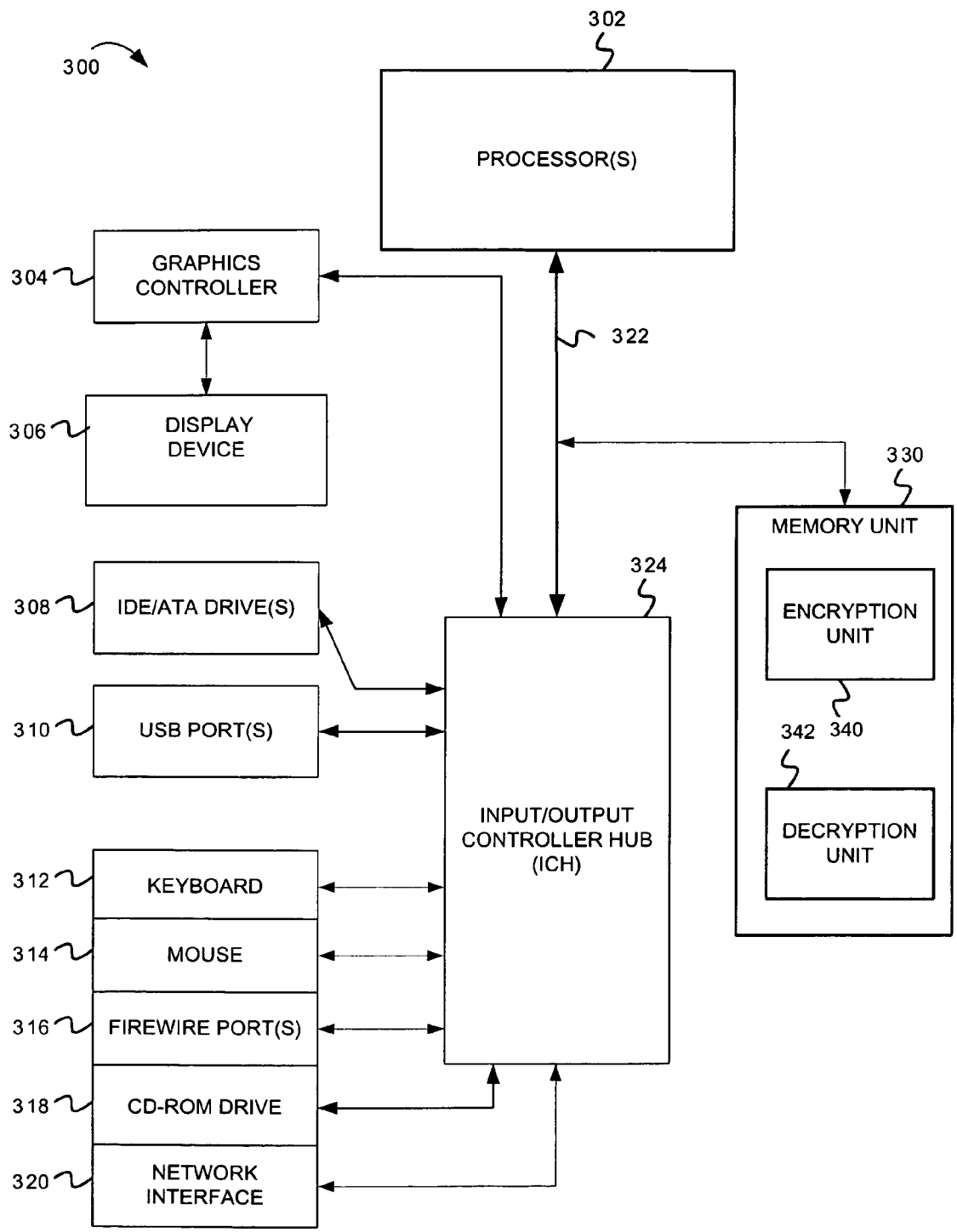
FIG. 3 is a block diagram illustrating a general-purpose computer system that can be used in conjunction with embodiments of the invention.

FIG. 3 is a block diagram illustrating a general-purpose computer system that can be used in conjunction with embodiments of the invention. As illustrated in FIG. 3, computer system 300 comprises processor(s) 302. The computer system 300 also includes a memory unit 330, processor bus 322, and Input/Output controller hub (ICH) 324. The processor(s) 302, memory unit 330, and ICH 324 are coupled to the processor bus 322. The processor(s) 302 may comprise any suitable processor architecture. The computer system 300 may comprise one, two, three, or more processors, any of which may execute a set of instructions in accordance with embodiments of the present invention.

The memory unit 330 includes an encryption unit 340 and a decryption unit 342. The memory unit 330 stores data and/or instructions, and may comprise any suitable memory, such as a dynamic random access memory (DRAM), for example. The computer system 300 also includes IDE drive(s) 308 and/or other suitable storage devices. A graphics controller 304 controls the display of information on a display device 306, according to embodiments of the invention.

The input/output controller hub (ICH) 324 provides an interface to I/O devices or peripheral components for the computer system 300. The ICH 324 may comprise any suitable interface controller to provide for any suitable communication link to the processor(s) 302, memory unit 330 and/or to any suitable device or component in communication with the ICH 324. For one embodiment of the invention, the ICH 324 provides suitable arbitration and buffering for each interface.

For one embodiment of the invention, the ICH 324 provides an interface to one or more suitable integrated drive electronics (IDE) drives 308, such as a hard disk drive (HDD) or compact disc read only memory (CD ROM) drive, or to suitable universal serial bus (USB) devices through one or more USB ports 310. For one embodiment, the ICH 324 also provides an interface to a keyboard 312, a mouse 314, a CD-ROM drive 318, and one or more suitable devices through one or more firewire ports 316. For one embodiment of the invention, the ICH 324 also provides a network interface 320 though which the computer system 300 can communicate with other computers and/or devices.

In one embodiment, the computer system 300 includes a machine-readable medium that stores a set of instructions (e.g., software) embodying any one, or all, of the methodologies for initializing secure communications with lightweight devices. Furthermore, software can reside, completely or at least partially, within memory unit 330 and/or within the processor(s) 302.

System Operations

Figure 4:
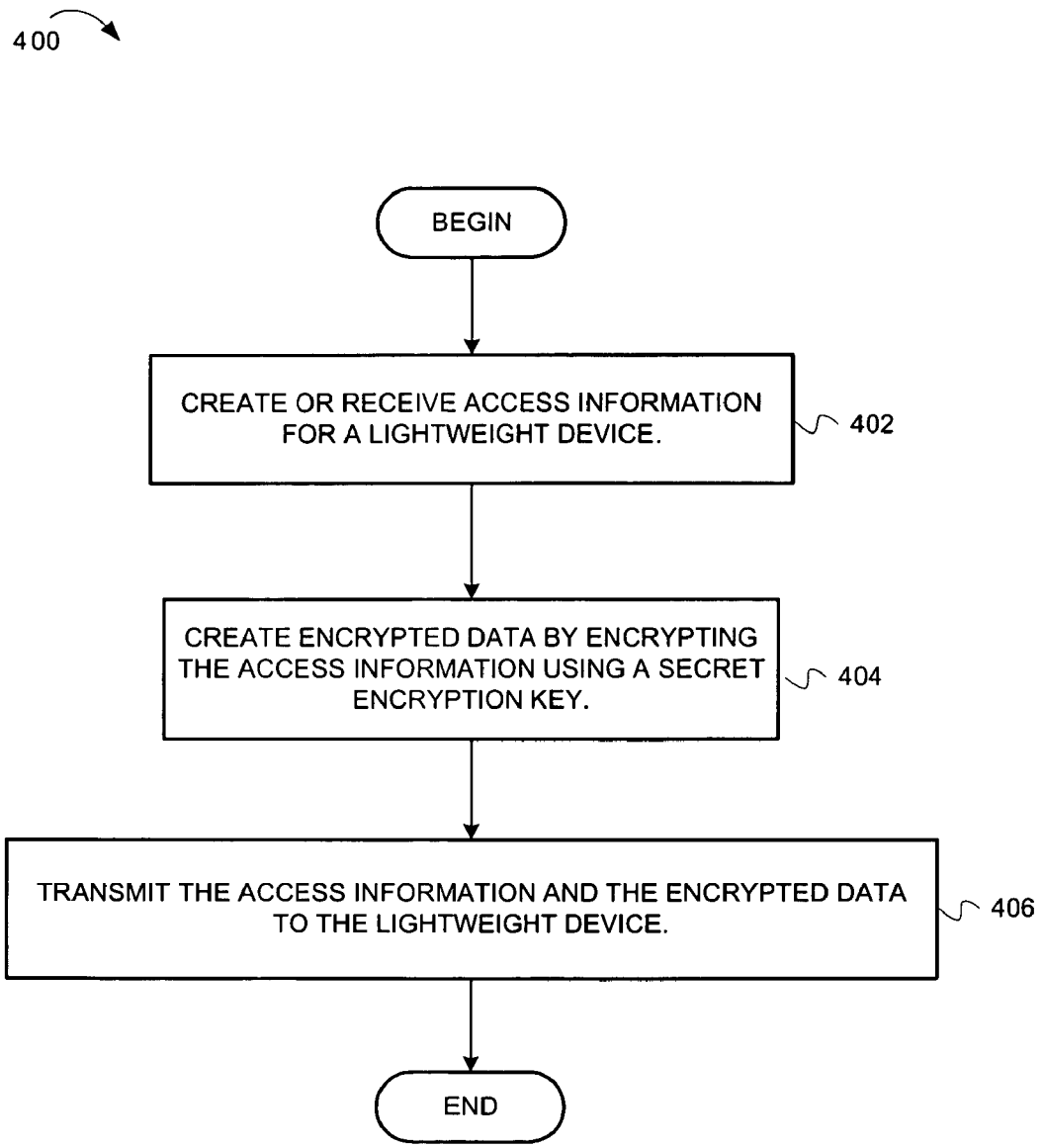
FIG. 4 is a flow diagram illustrating operations for creating and transmitting information to a lightweight device, where the information will be used for establishing secure communications with network devices, according to exemplary embodiments of the invention.
Figure 5:
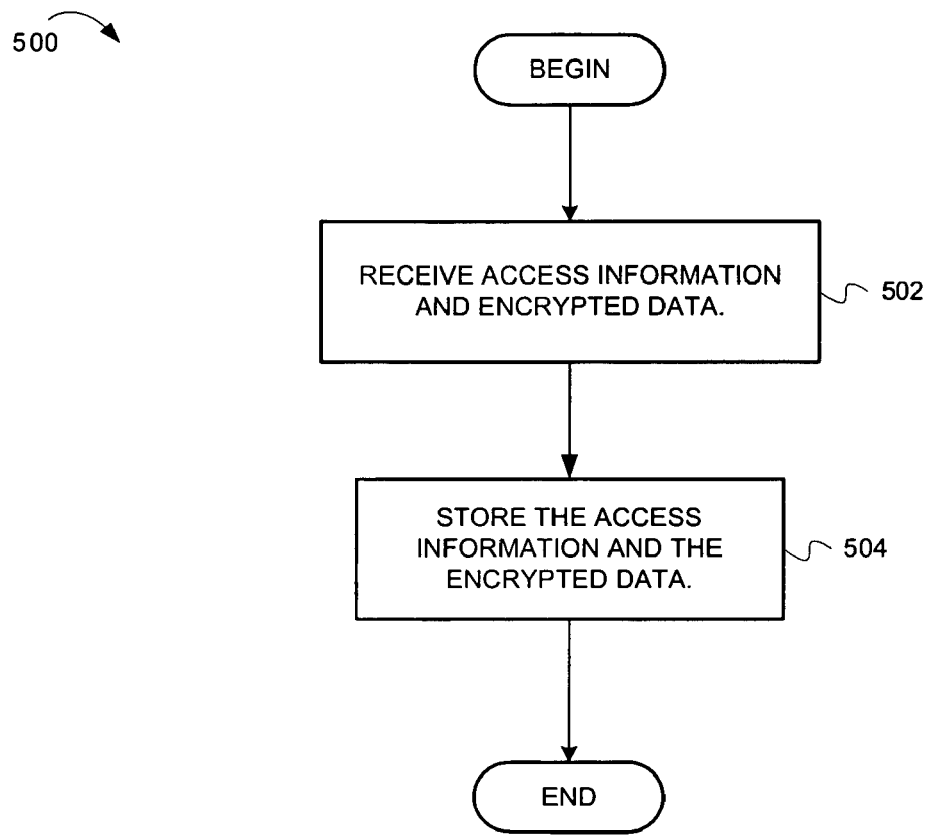
FIG. 5 is a flow diagram illustrating operations for receiving access information and encrypted data.

This section will describe operations performed by devices used in conjunction with embodiments of the invention. For example, this section will describe operations performed by devices of the system 200. FIGS. 4 and 5 describe operations performed by an access authority device 202, whereas FIGS. 6-7 describe operations performed by the lightweight devices. FIG. 8 describes operations performed by an access authority device to support the installation of a replacement device manager.

FIG. 4 is a flow diagram illustrating operations for creating and transmitting information to a lightweight device, where the information will be used for establishing secure communications with network devices, according to exemplary embodiments of the invention. The operations of the flow diagram 400 will be described with reference to the communications network 200 of FIG. 2. The flow diagram 400 commences at block 402.

At block 402, access information for use by a lightweight device is created or received. For example, the access authority device 202 creates or receives access information. The lightweight devices 210 can use the access information to establish secure communications with the device manager 208 or other network device. In one embodiment, the access information can include a set of cryptographic keys for establishing secure communications between the device manager 110 and the lightweight device 106. The flow continues at block 404.

At block 404, encrypted data is created by encrypting the access information using a secret key. For example, the access authority device 202 uses the encryption unit 204 to create an encrypted version of the access information, where the encryption is performed using a secret key. This secret key may be the private key for asymmetric encryption or a symmetric key known only to the access authority device 202. The flow continues at block 406.

At block 406, the access information and the encrypted data are transmitted to the lightweight devices. For example, the access authority device 202 transmits the encrypted data and access information to the lightweight devices 202.

The operations described in the flow diagram 400 can be performed when the lightweight devices are manufactured. For example, at manufacture time, the access authority device 202 can be connected to each lightweight device using a dedicated secure connection (e.g., an RS-232 connection). The access authority device 202 can then securely transmit access information and encrypted data to the lightweight devices. Alternatively, the operations can be performed after the manufacturing process.

While FIG. 4 describes access authority device operations for transmitting access information and encrypted data to lightweight devices, FIG. 5 describes lightweight device operations for receiving the access information and encrypted data from the access authority.

FIG. 5 is a flow diagram illustrating operations for receiving access information and encrypted data. The operations described in FIG. 5, like those of FIG. 4, can be performed at manufacture time. The operations of the flow diagram 500 will be described with reference to the computer network shown in FIG. 2. The flow diagram 500 commences at block 502.

At block 502, access information is received. For example, the lightweight devices 210 receive access information and encrypted data from the access authority device 202. As indicated above, the lightweight devices can use the access information and encrypted data to establish secure communications connections with network devices (e.g., the device manager 208). The flow continues at block 504.

At block 504, the access information and encrypted data are stored. For example, the lightweight devices 210 store the access information and encrypted data in their storage units 212. From block 504, the flow ends.

FIGS. 4 and 5 describe operations for configuring the lightweight devices with access information and encrypted data. As indicated above, these operations can be performed at manufacture time. The operations shown in FIGS. 6-8 describe operations for establishing secure communications between lightweight devices and a device manager, after the communications network has been deployed into the field.

Figure 6:
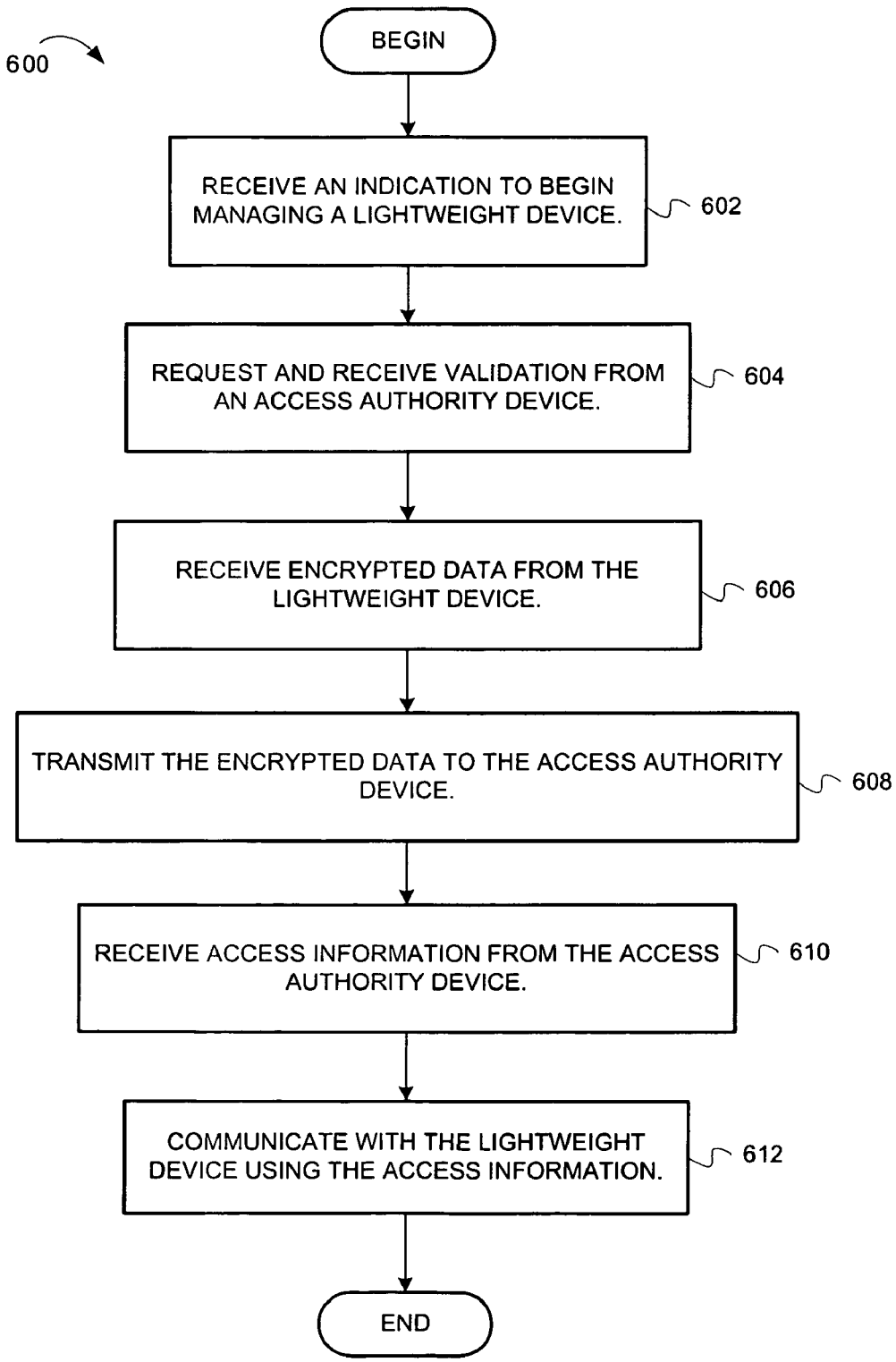
FIG. 6 is a flow diagram illustrating operations for establishing secure communications between a device manager and a lightweight device, according to exemplary embodiments of the invention.

FIG. 6 is a flow diagram illustrating operations for establishing secure communications between a device manager and a lightweight device, according to exemplary embodiments of the invention. The flow diagram 600 will be described with reference to the exemplary communications system shown in FIG. 2. The flow diagram 600 commences at block 602.

At block 602, an indication to begin managing one or more lightweight devices is received. For example, the device manager 208 receives an indication to begin managing one or more of the lightweight devices 210. In one embodiment, the device manager 208 receives the indication as a result of a button actuation. For example, after configuring the device manager 208, a technician presses a button on the device manager 208 that triggers it to begin managing the lightweight devices 210. In one embodiment, the device manager 208 polls the network for lightweight devices. An alternative embodiment, the device manager waits to receive management requests from the lightweight devices 210. The flow continues at block 604.

At block 604, validation from an access authority device is requested and received. For example, the device manager 208 requests and receives validation from the access authority device 202. The access authority 202 can use any suitable validation technique, such as digital certificates, to validate the device manager 208. The flow continues at block 606.

At block 606, encrypted data is received from a lightweight device. For example, the device manager 208 receives encrypted data from a lightweight device 210. The flow continues at block 608.

At block 608, the encrypted data is transmitted to an access authority device. For example, the device manager 208 transmits the encrypted data to the access authority device 202. The flow continues at block 610.

At block 610, access information is received from the access authority device. For example, the device manager 208 receives access information from the access authority device 202. In one embodiment, the access information includes a cryptographic key for establishing secure communications with a lightweight device 210. As noted above, the device manager 208 receives the access information from the access authority device 202 over a secure channel. The flow continues at block 612.

At block 612, the access information is used for communicating with the lightweight device. For example, the device manager 208 communicates with the lightweight device 210 using the access information. As noted above, the access information can include a cryptographic key. At this point in the flow, both the device manager 208 and lightweight device 210 can possess the cryptographic key, so they can begin exchanging messages encrypted with that cryptographic key. From block 612, the flow ends.

Figure 7:
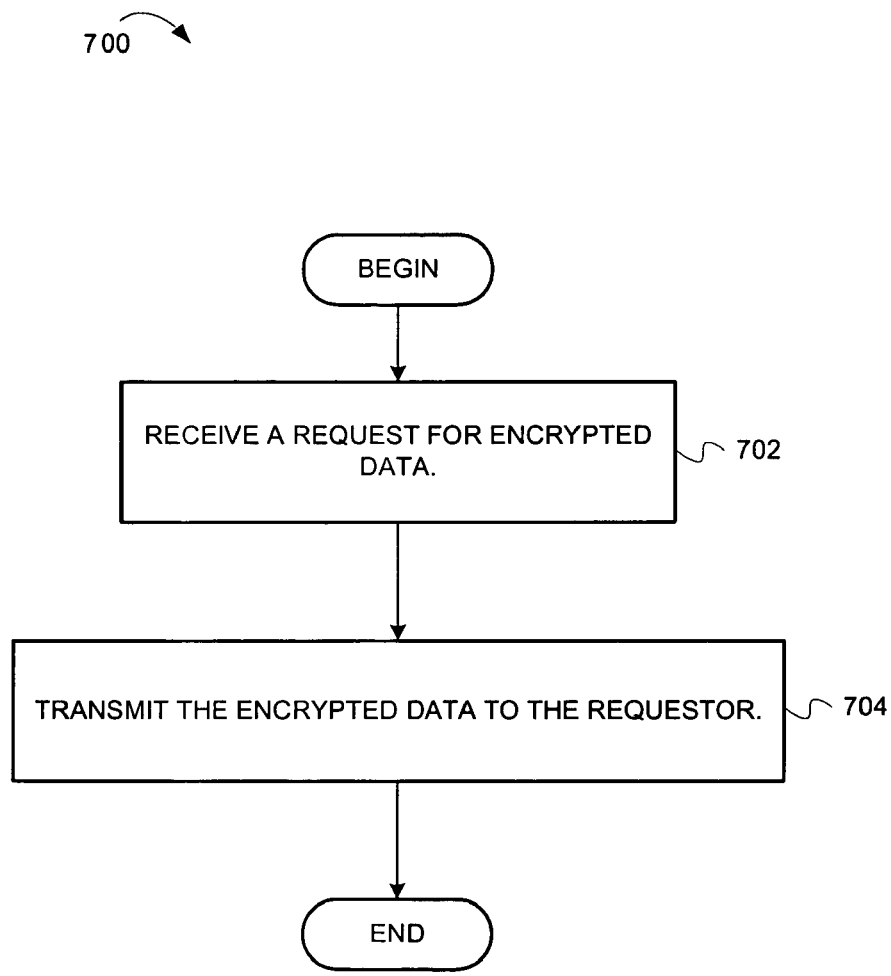
FIG. 7 is a flow diagram illustrating operations for transmitting encrypted data to a device manager, according to exemplary embodiments of the invention.
Figure 8:
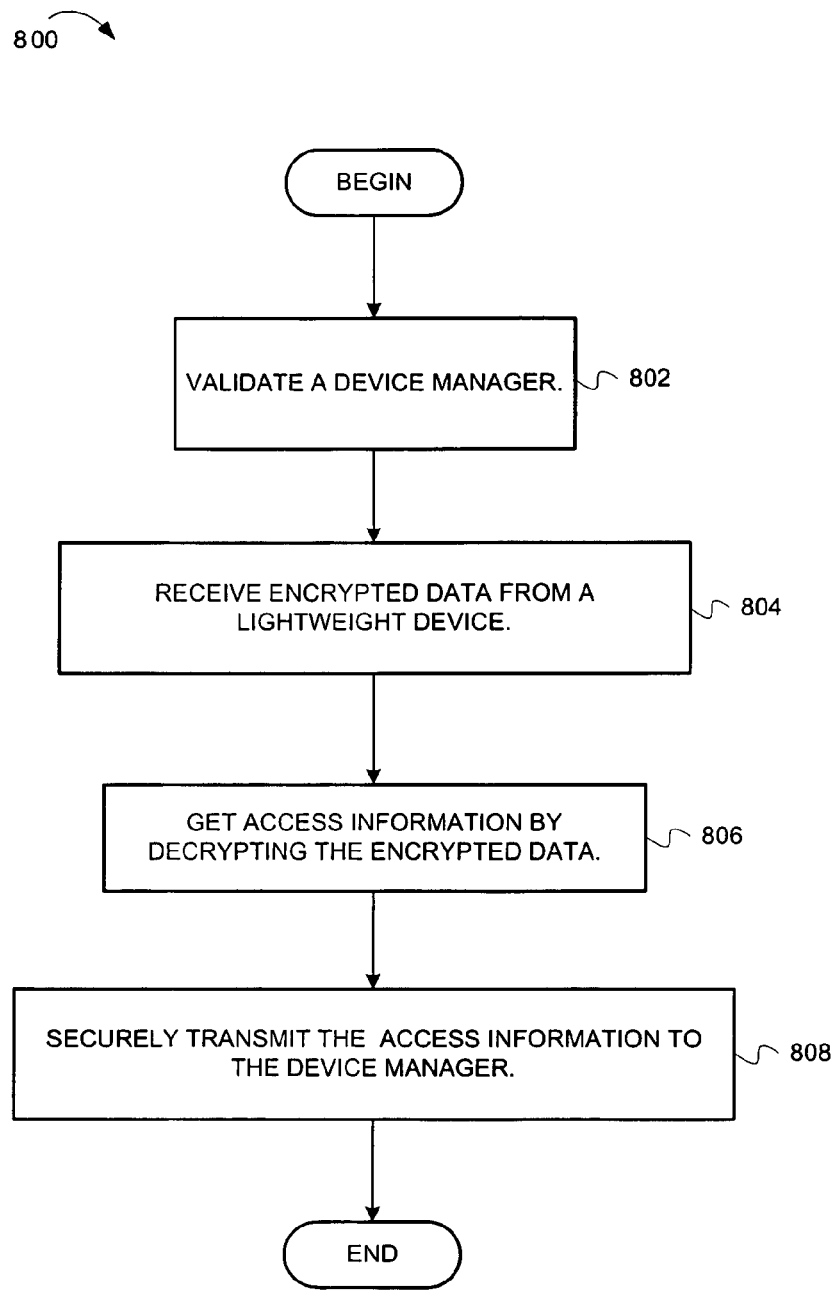
FIG. 8 is a flow diagram illustrating operations performed by an access authority device in the course of establishing secure communications between a device manager and lightweight device.

FIG. 7 is a flow diagram illustrating operations for transmitting encrypted data to a device manager, according to exemplary embodiments of the invention. The flow diagram 700 will be described with reference to the communications network described in FIG. 2. The flow diagram 700 commences at block 702.

At block 702, a request for encrypted data is received. For example, one of the lightweight devices 210 receives a request for encrypted data from the device manager 208.

In one embodiment, the lightweight device 210 is able to validate the request because the request is encrypted in a valid cryptographic key. The lightweight device can validate that the request came from a device manager 208 that has been vetted by the access authority device 202.

In one embodiment, the lightweight device 210 has bindings between keys and access rights. The lightweight device 210 can validate that this request has the correct access rights if the cryptographic key used to encrypt the request matches one that has the corresponding access right(s). These access rights could include read, write, modify, control, and configure rights for various assets within the lightweight device.

In one embodiment the lightweight device 210 receives the request from a new device manager 208 after the light weight device's management has been moved from a previous device manager to the new device manager 208. After being moved, the lightweight device 210 should no longer use any cryptographic keys that were used with the previous device manager because the reason for the move may have been because the previous device manager 208 was compromised or the lightweight device 210 now may be owned by a new organization. In one embodiment, the lightweight device 210 must use a completely new set of cryptographic keys associated with the new device manager 208. This new device manager 208 may be a replacement for a defunct or compromised device manager within the same network, or the lightweight device 210 may have been moved to a new network. The flow continues at block 704.

At block 704, the encrypted data is transmitted to the requester. For example, one of the lightweight devices 210 transmits the encrypted data to the device manager 208. In alternative embodiments, the lightweight devices 210 can receive requests from and transmit encrypted data to other network devices.

In one embodiment, the lightweight devices 210 do not receive requests, but instead, transmit the encrypted data in response to some event. For example, the lightweight devices 210 transmit the encrypted data in response to an event in an installation procedure such as removing a seal, a first application of power, pressing an initialization button on the lightweight device, or the event may be an elapsed time of inability to communicate exceeding some threshold.

In the preceding discussion, operations for establishing secure communications between a device manager and a lightweight device were described. The discussion continues with a description of operations performed by an access authority device, where the operations are for establishing secure communications between a device manager and the lightweight devices.

FIG. 8 is a flow diagram illustrating operations performed by an access authority device in the course of establishing secure communications between a device manager and lightweight device. The flow diagram 800 will be described with reference to the exemplary network shown in FIG. 2. The flow diagram 800 begins at block 802.

At block 802, a device manager is validated. For example, the access authority device 202 validates a device manager 208. In one embodiment, the operation at block 802 is performed in response to a device manager's validation request (see block 604 of FIG. 6). The flow continues at block 804.

At block 804, encrypted data is received from a lightweight device via the requesting device manager. For example, the access authority 202 receives encrypted data from a lightweight device 210 via device manager 208. The flow continues at block 806.

At block 806, access information is made available by decrypting the encrypted data. For example, the access authority 202 makes available access information by decrypting the encrypted data with the decryption unit 206. The flow continues at block 808.

At block 808, the access information is securely transmitted to the device manager. For example, the access authority 202 securely transmits the access information to the device manager 208. In one embodiment, the access authority 202 securely transmits the access information to the device manager 208 by encrypting the access information with a key that is known by the device manager 208. Alternatively, the access authority device 202 transmits the access information to the device manager 208 over a physically secure link. From block 808, the flow ends.

Thus, a system and method for establishing secure communications with a lightweight device have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method for enabling a device manager to securely communicate with a lightweight device, the method comprising:

receiving at an access authority device encrypted data from the device manager, wherein the device manager received the encrypted data from the lightweight device, and further wherein the encrypted data was encrypted by a device other than the lightweight device;

decrypting the encrypted data to produce access information, wherein the access information comprises a set of cryptographic keys or secret information to allow the lightweight device to generate a sequence of cryptographic keys to be used for establishing secure communications between the device manager and the lightweight device; and securely transmitting the access information to the device manager;

wherein the access authority device transmits access information and encrypted data to the lightweight device over a secure channel before the lightweight device is placed into the field; and wherein the lightweight device does not perform any cryptographic operations before the lightweight device and the device manager securely exchange data over an insecure physical link.

2. The method of claim 1, wherein the access information includes one or more cryptographic keys.

3. The method of claim 1, wherein the access information includes information about generating one or more cryptographic keys.

4. The method of claim 1, wherein the access information includes a binding between a cryptographic key and access rights to assets of the lightweight device.

5. The method of claim 1, further comprising:
receiving or creating at the access authority device the access information for the lightweight device;
encrypting the access information to produce the encrypted data; and
transmitting the access information and the encrypted data to the lightweight device.

6. The method of claim 5, wherein the encrypting uses a public key.

7. The method of claim 5, wherein the encrypting uses a symmetric key.

8. The method of claim 5, wherein the transmitting the access information and the encrypted data to the lightweight device is performed while the lightweight device is being manufactured.

9. The method of claim 5, wherein the transmitting the access information and the encrypted data to the lightweight device is performed after the lightweight device has been manufactured.

10. The method of claim 1, further comprising:
validating the device manager.

11. A method comprising:
transmitting encrypted data from a lightweight device to a device manager, wherein the encrypted data includes access information, wherein the access information comprises a set of cryptographic keys or secret information to allow the lightweight device to generate a sequence of cryptographic keys to be used for establishing secure communications between the device manager and the lightweight device; and
securely communicating with the device manager using the access information;
wherein an access authority device transmits access information and encrypted data to the lightweight device over a secure channel before the lightweight device is placed into the field; and
wherein the lightweight device does not perform any cryptographic operations before the lightweight device and the device manager securely exchange data over an insecure physical link.

12. The method of claim 11, further comprising:
receiving, from the device manager, a request for the encrypted data.

13. The method of claim 11, wherein the access information includes a set of one or more cryptographic keys.

14. The method of claim 11, wherein the access information includes information about generating one or more cryptographic keys.

15. The method of claim 11, wherein the access information includes a binding between a cryptographic key and access rights to assets of the lightweight device.

16. The method of claim 11, further comprising:
encrypting the access information to produce the encrypted data; and
storing the access information and the encrypted data.

17. The method of claim 11, further comprising:
receiving the access information and the encrypted data; and
storing the access information and the encrypted data.

18. The method of claim 17, wherein the access information and the encrypted data are received from an access authority device, and wherein the access authority device encrypted the access information to produce the encrypted data.

19. The method of claim 17, wherein the receiving is performed over a secure communication channel.

20. A non-transitory tangible machine-readable storage medium that provides instructions, which when executed by a machine, cause the machine to perform operations for initializing secure communication with a lightweight device comprising:
receiving at a device manager encrypted data from the lightweight device;
transmitting the encrypted data to an access authority device;
receiving access information from the access authority device, wherein the access information comprises a set of cryptographic keys or secret information to allow the lightweight device to generate a sequence of cryptographic keys to be used for establishing secure communications between the device manager and the lightweight device; and
communicating with the lightweight device using the access information;
wherein the access authority device transmits access information and encrypted data to the lightweight device over a secure channel before the lightweight device is placed into the field; and
wherein the lightweight device does not perform any cryptographic operations before the lightweight device and the device manager securely exchange data over an insecure physical link.

21. The non-transitory tangible machine-readable storage medium of claim 20, wherein the machine is a device manager, and wherein the lightweight device was previously communicating with a different device manager.

22. The non-transitory tangible machine-readable storage medium of claim 20, the operations further comprising:
receiving an indication to begin managing the lightweight device.

23. The non-transitory tangible machine-readable storage medium of claim 20, the operations further comprising:
polling to determine whether any lightweight devices need a manger.

24. The non-transitory tangible machine-readable storage medium of claim 20, the operations further comprising:
requesting validation from the access authority device; and
receiving validation from the access authority device.

25. A system comprising:
a lightweight device, wherein the lightweight device includes an access information storage unit to store encrypted data and to store access information;
an access authority device, to decrypt the encrypted data to produce the access information; and
a device manager to manage the lightweight device, the device manager to receive the encrypted data from the lightweight device, the device manager to transmit the encrypted data to the access authority device, the device manager to receive the access information from the access authority device, and the device manager to communicate with the lightweight device using the access information;

wherein the access authority device transmits access information and encrypted data to the lightweight device over a secure channel before the lightweight device is placed into the field;

wherein the lightweight device does not perform any cryptographic operations before the lightweight device and the device manager securely exchange data over an insecure physical link; and wherein the access information comprises a set of cryptographic keys or secret information to allow the lightweight device to generate a sequence of cryptographic keys to be used for establishing secure communications between the device manager and the lightweight device.

26. The system of claim 25, wherein the lightweight device is one of a first set of one or more lightweight devices, wherein the access authority device is one of a second set of one or more access authority devices, and wherein the device manager is one of a third set of one or more device managers.

27. The system of claim 26, wherein the device manager can be replaced by another of the third set of one or more device managers, wherein upon replacement, the other of the third set is to receive the encrypted data from the lightweight device, wherein the other device manager is to transmit the encrypted data to the access authority device, the other device manager to receive the access information from the access authority device, and the other device manager to communicate with the lightweight device using the access information.

28. The system of claim 25, wherein the system is one of a plurality of systems, and wherein the lightweight device can be moved from the system to another system of the plurality of systems, and wherein the movement does not include providing the other system with any information that could compromise the system.

29. A lightweight device comprising:
means for transmitting encrypted data from a lightweight device to a device manager, wherein the encrypted data includes access information, wherein the access information comprises a set of cryptographic keys or secret information to allow the lightweight device to generate a sequence of cryptographic keys to be used for establishing secure communications between the device manager and the lightweight device; and means for securely communicating with the device manager using the access information;

wherein an access authority device transmits access information and encrypted data to the lightweight device over a secure channel before the lightweight device is placed into the field; and wherein the lightweight device does not perform any cryptographic operations before the lightweight device and the device manager securely exchange data over an insecure physical link.

30. The lightweight device of claim 29, further comprising:
means for receiving, from the device manager, a request for the encrypted data.

31. The lightweight device of claim 29, wherein the access information includes a set of one or more encryption keys.

32. The method of claim 2, wherein the lightweight device uses a different set of cryptographic keys for each new device manager.

33. The method of claim 3, wherein the lightweight device generates and uses a different set of cryptographic keys for each new device manager.

34. The method of claim 5, wherein one or more of the device manager, the lightweight device, and the access authority device are adapted to independently perform the operations of:
receiving or creating at the access authority device the access information for the lightweight device;
encrypting the access information to produce the encrypted data; and
transmitting the access information and the encrypted data to the lightweight device.

35. The method of claim 34, wherein each of the device manager, the lightweight device, and the access authority device can encrypt the access information to produce the encrypted data using a secret private key and the lightweight device and the access authority device can decrypt the encrypted data using a corresponding public key known only to the device manager, the lightweight device, and the access authority device.

* * * * *